US008181151B2

(12) United States Patent
Sedukhin et al.

(10) Patent No.: US 8,181,151 B2
(45) Date of Patent: May 15, 2012

(54) MODELING AND MANAGING HETEROGENEOUS APPLICATIONS

(75) Inventors: Igor Sedukhin, Issaquah, WA (US); Daniel Eshner, Issaquah, WA (US); Stephen T. Swartz, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 1196 days.

(21) Appl. No.: 11/925,591

(22) Filed: Oct. 26, 2007

(65) Prior Publication Data

US 2009/0113379 A1    Apr. 30, 2009

(51) Int. Cl.
G06F 9/44 (2006.01)
G06F 15/16 (2006.01)
G06F 17/30 (2006.01)

(52) U.S. Cl. ..... 717/104; 717/106; 709/201; 707/999.1; 707/999.107

(58) Field of Classification Search .......... None
See application file for complete search history.

(56) References Cited

U.S. PATENT DOCUMENTS

| | | | |
|---|---|---|---|
| 4,751,635 A | 6/1988 | Kret |
| 5,423,003 A | 6/1995 | Berteau |
| 5,602,991 A | 2/1997 | Berteau |
| 5,655,081 A | 8/1997 | Bonnell |
| 5,764,241 A | 6/1998 | Elliott |
| 5,809,266 A | 9/1998 | Touma |
| 5,893,083 A | 4/1999 | Eshghi |
| 5,913,062 A | 6/1999 | Vrvilo et al. |
| 5,937,388 A | 8/1999 | Davis et al. |
| 5,958,010 A | 9/1999 | Agarwal |
| 6,005,849 A | 12/1999 | Roach et al. |
| 6,026,404 A | 2/2000 | Adunuthula |
| 6,055,363 A | 4/2000 | Beals et al. |
| 6,070,190 A | 5/2000 | Reps |
| 6,167,538 A | 12/2000 | Neufeld et al. |
| 6,225,995 B1 | 5/2001 | Jacobs |
| 6,230,309 B1 | 5/2001 | Turner |
| 6,247,056 B1 | 6/2001 | Chou |
| 6,263,339 B1 | 7/2001 | Hirsch |
| 6,279,009 B1 | 8/2001 | Smirnov et al. |
| 6,330,717 B1 | 12/2001 | Raverdy |
| 6,334,114 B1 | 12/2001 | Jacobs |

(Continued)

FOREIGN PATENT DOCUMENTS

EP    0733967    9/1996

(Continued)

OTHER PUBLICATIONS

Rowe, L.A., et al., Automating the Selection of Implementation Structures, IEEE Transactions on Software Engineering, Nov. 1978, pp. 494-506, [retrieved on Jan. 6, 2012], Retrieved from the Internet: <URL:http://ieeexplore.ieee.org/>.*

(Continued)

Primary Examiner — Thuy Dao
Assistant Examiner — Geoffrey St Leger
(74) Attorney, Agent, or Firm — Workman Nydegger

(57) ABSTRACT

The present invention extends to methods, systems, and computer program products for modeling and managing heterogeneous applications. Application intent can be described in a relatively straight forward manner that abstracts underlying implementation details. Thus, application developers can develop applications without necessarily having to know extensive details of an underlying implementation environment. In any event, an application can be executed in different implementation environments without requiring changes to the corresponding model.

19 Claims, 6 Drawing Sheets

U.S. PATENT DOCUMENTS

| | | |
|---|---|---|
| 6,336,217 B1 | 1/2002 | D'Anjou et al. |
| 6,342,907 B1 | 1/2002 | Petty |
| 6,415,297 B1 | 7/2002 | Leymann et al. |
| 6,477,665 B1 | 11/2002 | Bowman-Amuah |
| 6,618,719 B1 | 9/2003 | Andrei |
| 6,640,241 B1 | 10/2003 | Ozzie |
| 6,654,783 B1 | 11/2003 | Hubbard |
| 6,662,205 B1 | 12/2003 | Bereiter |
| 6,697,877 B1 | 2/2004 | Martin |
| 6,710,786 B1 | 3/2004 | Jacobs |
| 6,715,145 B1 | 3/2004 | Bowman-Amuah |
| 6,718,535 B1 | 4/2004 | Underwood |
| 6,801,818 B2 | 10/2004 | Kopcha |
| 6,847,970 B2 | 1/2005 | Keller et al. |
| 6,854,069 B2 | 2/2005 | Kampe |
| 6,886,024 B1 | 4/2005 | Fujita |
| 6,907,395 B1 | 6/2005 | Hunt |
| 6,931,644 B2 | 8/2005 | Riosa |
| 6,934,702 B2 | 8/2005 | Faybishenko |
| 6,941,341 B2 | 9/2005 | Logston |
| 7,051,098 B2 | 5/2006 | Masters |
| 7,055,143 B2 | 5/2006 | Ringseth et al. |
| 7,065,579 B2 | 6/2006 | Traversat |
| 7,072,807 B2 | 7/2006 | Brown |
| 7,072,934 B2 | 7/2006 | Helgeson |
| 7,079,010 B2 | 7/2006 | Champlin |
| 7,085,837 B2 | 8/2006 | Kimbrel |
| 7,096,258 B2 | 8/2006 | Hunt |
| 7,103,874 B2 | 9/2006 | McCollum et al. |
| 7,130,881 B2 | 10/2006 | Volkov et al. |
| 7,150,015 B2 | 12/2006 | Pace et al. |
| 7,155,380 B2 | 12/2006 | Hunt |
| 7,155,466 B2 | 12/2006 | Rodriguez |
| 7,162,509 B2 | 1/2007 | Brown et al. |
| 7,168,077 B2 | 1/2007 | Kim |
| 7,174,359 B1 | 2/2007 | Hamilton, II et al. |
| 7,178,129 B2 | 2/2007 | Katz |
| 7,200,530 B2 | 4/2007 | Brown et al. |
| 7,219,351 B2 | 5/2007 | Bussler et al. |
| 7,263,689 B1 | 8/2007 | Edwards et al. |
| 7,379,999 B1 | 5/2008 | Zhou et al. |
| 7,383,277 B2 | 6/2008 | Gebhard et al. |
| 7,403,956 B2 * | 7/2008 | Vaschillo et al. ............ 707/770 |
| 7,444,618 B2 * | 10/2008 | Kulkarni et al. ............ 717/114 |
| 7,487,080 B1 | 2/2009 | Tocci |
| 7,512,707 B1 | 3/2009 | Manapragada |
| 7,526,734 B2 | 4/2009 | Vasilev |
| 7,703,075 B2 * | 4/2010 | Das et al. ...................... 717/123 |
| 7,761,844 B2 * | 7/2010 | Bove et al. .................... 717/106 |
| 7,774,744 B2 * | 8/2010 | Moore et al. .................. 717/104 |
| 7,796,520 B2 | 9/2010 | Poustchi |
| 7,797,289 B2 | 9/2010 | Chan et al. |
| 7,844,942 B2 | 11/2010 | Eilam |
| 7,890,543 B2 * | 2/2011 | Hunt et al. ................... 707/803 |
| 2002/0035593 A1 | 3/2002 | Salim et al. |
| 2002/0038217 A1 | 3/2002 | Young |
| 2002/0099818 A1 | 7/2002 | Russell |
| 2002/0111841 A1 | 8/2002 | Leymann |
| 2002/0120917 A1 | 8/2002 | Abrari et al. |
| 2002/0133504 A1 | 9/2002 | Vlahos et al. |
| 2002/0135611 A1 | 9/2002 | Deosaran |
| 2002/0147515 A1 | 10/2002 | Fava et al. |
| 2002/0147962 A1 | 10/2002 | Hatanaka |
| 2002/0198734 A1 | 12/2002 | Greene |
| 2003/0005411 A1 | 1/2003 | Gerken |
| 2003/0061342 A1 | 3/2003 | Abdelhadi |
| 2003/0084156 A1 | 5/2003 | Graupner et al. |
| 2003/0135384 A1 | 7/2003 | Nguyen |
| 2003/0149685 A1 | 8/2003 | Trossman |
| 2003/0182656 A1 | 9/2003 | Leathers |
| 2003/0195763 A1 | 10/2003 | Gulcu |
| 2003/0208743 A1 | 11/2003 | Chong |
| 2004/0034850 A1 | 2/2004 | Burkhardt |
| 2004/0040015 A1 * | 2/2004 | Jordan, II ...................... 717/136 |
| 2004/0046785 A1 | 3/2004 | Keller |
| 2004/0078461 A1 | 4/2004 | Bendich et al. |
| 2004/0088350 A1 | 5/2004 | Early |
| 2004/0102926 A1 | 5/2004 | Adendorff |
| 2004/0148184 A1 | 7/2004 | Sadiq |
| 2004/0162901 A1 | 8/2004 | Mangipudi |
| 2004/0249972 A1 | 12/2004 | White |
| 2005/0005200 A1 | 1/2005 | Matena et al. |
| 2005/0010504 A1 | 1/2005 | Gebhard et al. |
| 2005/0011214 A1 | 2/2005 | Schwetfuehrer |
| 2005/0055692 A1 | 3/2005 | Lupini |
| 2005/0071737 A1 | 3/2005 | Adendorff |
| 2005/0074003 A1 | 4/2005 | Ball |
| 2005/0091227 A1 | 4/2005 | McCollum et al. |
| 2005/0120106 A1 | 6/2005 | Albertao |
| 2005/0125212 A1 | 6/2005 | Hunt et al. |
| 2005/0132041 A1 | 6/2005 | Kundu |
| 2005/0137839 A1 | 6/2005 | Mansurov |
| 2005/0155042 A1 | 7/2005 | Kolb et al. |
| 2005/0165906 A1 | 7/2005 | Deo et al. |
| 2005/0182750 A1 | 8/2005 | Krishna et al. |
| 2005/0188075 A1 | 8/2005 | Dias |
| 2005/0216831 A1 | 9/2005 | Guzik |
| 2005/0246656 A1 | 11/2005 | Vasilev |
| 2005/0251546 A1 | 11/2005 | Pichetti et al. |
| 2005/0261875 A1 | 11/2005 | Shrivastava |
| 2005/0268307 A1 | 12/2005 | Gates et al. |
| 2005/0278702 A1 | 12/2005 | Koyfman |
| 2005/0283518 A1 | 12/2005 | Sargent |
| 2006/0010142 A1 | 1/2006 | Kim |
| 2006/0010164 A1 | 1/2006 | Netz |
| 2006/0013252 A1 | 1/2006 | Smith |
| 2006/0036743 A1 | 2/2006 | Deng |
| 2006/0064460 A1 | 3/2006 | Sugawara |
| 2006/0070066 A1 | 3/2006 | Grobman |
| 2006/0070086 A1 | 3/2006 | Wang |
| 2006/0074730 A1 | 4/2006 | Shukla et al. |
| 2006/0074734 A1 | 4/2006 | Shukla |
| 2006/0095443 A1 | 5/2006 | Kumar |
| 2006/0123389 A1 | 6/2006 | Kolawa et al. |
| 2006/0123412 A1 | 6/2006 | Hunt |
| 2006/0155738 A1 | 7/2006 | Baldwin |
| 2006/0161862 A1 | 7/2006 | Racovolis et al. |
| 2006/0173906 A1 | 8/2006 | Chu et al. |
| 2006/0206537 A1 | 9/2006 | Chiang |
| 2006/0230314 A1 | 10/2006 | Sanjar |
| 2006/0235859 A1 | 10/2006 | Hardwick |
| 2006/0236254 A1 | 10/2006 | Mateescu |
| 2006/0242195 A1 * | 10/2006 | Bove et al. .................. 707/103 R |
| 2006/0265231 A1 | 11/2006 | Fusaro et al. |
| 2006/0277323 A1 | 12/2006 | Joublin |
| 2006/0277437 A1 | 12/2006 | Ohtsuka |
| 2006/0294502 A1 * | 12/2006 | Das et al. ...................... 717/129 |
| 2006/0294506 A1 | 12/2006 | Dengler |
| 2007/0005283 A1 | 1/2007 | Blouin |
| 2007/0005299 A1 | 1/2007 | Haggerty |
| 2007/0006122 A1 | 1/2007 | Bailey et al. |
| 2007/0016615 A1 | 1/2007 | Mohan et al. |
| 2007/0033088 A1 | 2/2007 | Aigner et al. |
| 2007/0050237 A1 | 3/2007 | Tien |
| 2007/0050483 A1 | 3/2007 | Bauer et al. |
| 2007/0061776 A1 | 3/2007 | Ryan et al. |
| 2007/0067266 A1 | 3/2007 | Lomet |
| 2007/0088724 A1 | 4/2007 | Demiroski |
| 2007/0089117 A1 | 4/2007 | Samson |
| 2007/0094350 A1 | 4/2007 | Moore |
| 2007/0112847 A1 | 5/2007 | Dublish |
| 2007/0168924 A1 * | 7/2007 | Kirby, Jr. ...................... 717/104 |
| 2007/0174228 A1 | 7/2007 | Folting |
| 2007/0174815 A1 | 7/2007 | Chrysanthakopoulos et al. |
| 2007/0179823 A1 | 8/2007 | Bhaskaran |
| 2007/0208606 A1 | 9/2007 | MacKay |
| 2007/0220177 A1 | 9/2007 | Kothari |
| 2007/0226681 A1 * | 9/2007 | Thorup ......................... 717/104 |
| 2007/0233879 A1 | 10/2007 | Woods |
| 2007/0244904 A1 | 10/2007 | Durski |
| 2007/0245004 A1 | 10/2007 | Chess |
| 2007/0277109 A1 | 11/2007 | Chen |
| 2007/0288885 A1 * | 12/2007 | Brunel et al. .................. 717/104 |
| 2007/0294364 A1 | 12/2007 | Mohindra et al. |
| 2008/0005729 A1 | 1/2008 | Harvey |
| 2008/0010631 A1 | 1/2008 | Harvey et al. |
| 2008/0127052 A1 * | 5/2008 | Rostoker ....................... 717/105 |

| | | | |
|---|---|---|---|
| 2008/0209414 | A1 | 8/2008 | Stein |
| 2008/0244423 | A1 | 10/2008 | Jensen-Pistorius |
| 2009/0049165 | A1 | 2/2009 | Long et al. |
| 2009/0187662 | A1 | 7/2009 | Manapragada et al. |
| 2009/0197662 | A1 | 8/2009 | Manapragada |
| 2009/0265458 | A1 | 10/2009 | Baker |
| 2010/0005527 | A1 | 1/2010 | Jeon |
| 2011/0219383 | A1 | 9/2011 | Bhaskar |

FOREIGN PATENT DOCUMENTS

| | | |
|---|---|---|
| EP | 1770510 | 4/2007 |
| WO | WO 00/38091 | 6/2000 |
| WO | 0124003 | 4/2001 |
| WO | WO0227426 A2 | 4/2002 |
| WO | 2007072501 | 6/2007 |

OTHER PUBLICATIONS

Oberle, D., et al., Developing and managing software components in an ontology-based application server, Proceedings of the 5th ACM/IFIP/USENIX international conference on Middleware, Oct. 2004, pp. 459-477, [retrieved on Jan. 6, 2012], Retrieved from the Internet: <URL:http://dl.acm.org/>.*
U.S. Appl. No. 11/925,184, Jan. 14, 2011, Office Action.
U.S. Appl. No. 12/105,083, filed Apr. 17, 2008 (Not Yet Published).
U.S. Appl. No. 11/740,737, Feb. 10, 2011, Office Action.
Office Action dated Mar. 2, 2010 cited in U.S. Appl. No. 11/771,816.
Office Action dated Mar. 18, 2010 cited in U.S. Appl. No. 11/740,737.
U.S. Appl. No. 11/925,079, Mar. 1, 2011, Notice of Allowance.
Office Action dated Apr. 5, 2010 cited in U.S. Appl. No. 11/771,827.
Office Action dated Apr. 13, 20210 cited in U.S. Appl. No. 11/925,326.
U.S. Appl. No. 11/925,184, Apr. 25, 2011, Office Action.
U.S. Appl. No. 11/740,737, Apr. 29, 2011, Notice of Allowance.
U.S. Appl. No. 11/925,326, Jul. 22, 2010, Notice of Allowance.
U.S. Appl. No. 11/925,079, Sep. 1, 2010, Office Action.
U.S. Appl. No. 11/740,737, Sep. 13, 2010, Office Action.
Eidson, Thomas M., "A Component-based Programming Model for Composite, Distributed Applications", Institute for Computer Applications in Science and Engineering Hampton, VA, May 2001, 1 page.
Bauer, Michael A., "Managing Distributed Applications and Systems: An Architectural Experiment", Jan. 31, 1997, 46 pages.
Albrecht, Jeannie, et al., "Remote Control: Distributed Application Configuration Management, and Visualization with Plush", Proceedings of the Twenty-first USENIX Large Installation System Administration Conference (LISA), Nov. 2007, 16 pages.
OSLO>Suite 2006, "OSLO Suite is the leading platform for designing, building and executing adaptive business solutions", http://www.oslo-software.com/en/product.php.
Tawfik, Sam, "Composite applications and the Teradata EDW", Extend the capabilities of your enterprise data warehouse with supporting applications, Teradata Magazine online, Archive: vol. 6, No. 4, Dec. 2006, 3 pages.
U.S. Appl. No. 11/844,177, Aug. 23, 2007, Sedukhin.
U.S. Appl. No. 11/740,737, Apr. 26, 2007, Sedukhin.
U.S. Appl. No. 11/771,827, Jun. 29, 2007, Sedukhin.
U.S. Appl. No. 11/771,816, Jun. 29, 2007, Sedukhin.
U.S. Appl. No. 11/925,079, Oct. 26, 2007, Bhaskar.
U.S. Appl. No. 11/925,326, Oct. 26, 2007, Christensen.
U.S. Appl. No. 11/925,680, Oct. 26, 2007, Sedukhin.
U.S. Appl. No. 11/925,067, Oct. 26, 2007, Sedukhin.
U.S. Appl. No. 11/925,184, Oct. 26, 2007, Voss.
U.S. Appl. No. 11/925,201, Oct. 26, 2007, Sedukhin.
U.S. Appl. No. 60/983,117, Oct. 26, 2007, Skierkowski.
Frecon, Emmanuel, et al., "DIVE: a scaleable network architecture for distributed virtual environments", The British Computer Society, The Institution of Electrical Engineers and IOP Publishing Ltd, Mar. 6, 1998, pp. 91-100.
Baldi, Mario, et al., "Exploiting Code Mobility in Decentralized and Flexible Network Management", Lecture Notes in Computer Science, vol. 1219, Proceedings of the First International Workshop on Mobile Agents, pp. 13-26.
Milenkovic, Milan, et al., "Towards Internet Distributed Computing", Sep. 26, 2003, http://m.students.umkc.edu/mpshxf/Towards_IDC.pdf.
"Managing Complexity in Middleware", by Adrian Colyer, Gordon Blair and Awais Rashid, IBM UK Limited Hursley Park, Winchester, England and Computing Department, Lancaster University, Bailrigg, Lancaster, England, [online] [retrieved on Apr. 20, 2007], 6 pages. Retrieved from the Internet: http://222.aosd.net/2005/workshops/acp4is/past/asp4is03/papers/colyer.pdf.
"User Interface Declarative Models and Development Environments: A Survey", by Paulo Pinheiro Da Silva, Department of Computer Science, University of Manchester, Manchester, England [online] [retrieved on Apr. 20, 2007], 20 pages. Retrieved from the Internet: http://www.cs.utep.edu/paulo/papers/PinheirodaSilva_DSVIS_2000.pdf.
"Architecturing and Configuring Distributed Application with Olan", by R. Balter, L. Bellissard, F. Boyer, M Riveill and J.Y. Vion-Dury, Middleware 98 Conference Report, INRIA, France, [online] [retrieved on Apr. 20, 2007], 15 pages. Retrieved from the Internet: http://www.comp.lancs.ac.uk/computing/middleware98/papers.html.
"A Load Balancing Module for the Apache Web Server", Author Unknown, [online] [retrieved on Apr. 20, 2007], 9 pgs. Retrived from the Internet: http://www.backhand.org/ApacheCon2000/US/mod_backhand_coursenotes.pdf.
"Performance Tuning and Optimization of J2ee Applications on the Jboss Platfom", by Samuel Kounev, Bjorn Weis and Alejandro Duchmann, Department of Computer Science, Darmstadt University of Technology, Germany, [online] [retrieved on Apr. 20, 2007], 10 pgs. Retrieved from the Internet: http://www.cl.cam.ac.uk/~sk507/pub/04-cmg-JBoss.pdf.
"Outlier Detection for Fine-Grained Load Balancing in Database Clusters", by Jin Chen, Gokul Soundararajan, Madalin Mihailescu and Cristiana Amaza, Department of Computer Science, Department of Electrical and Computer Engineering, University of Toronto, [online] [retrieved on Apr. 20, 2007], 10 pgs. Retrieved from the Internet: http://www.cs.toronto.edu/~jinchen/papers/smdb07.pdf.
Dias, M. Bernardine, et al., "A Real-Time Rover Executive Based on Model-Based Reactive Planning" The 7th International Symposium on Artificial Intelligence, Robotics and Automation in Space, May 2003.
Goble, Carole, et al., "Building Large-scale, Service-Oriented Distributed Systems using Semantic Models", http://www.jisc.ac.uk/media/documents/programmes/capital/grid_standards_above_ogsa.pdf, 21 pages.
Robinson, William N., "Implementing Rule-based Monitors within a Framework for continuous Requirements Monitoring", Proceedings of the 38th Hawaii International Conference on System Sciences, 2005 IEEE, 10 pages.
Maghraoul Kaoutar El, et al., "Model Driven Provisionings: Bridging the Gap Between Declarative Object Models and Procedural Provisioning Tools", http://wcl.cs.rpi.edu/papers/middleware06.pdf.
Alpern, Bowen, et al, "PDS: A Virtual Execution Environment for Software Deployment", 2005, pp. 175-185.
Talcott, Carolyn L., MTCoord 2005 Preliminary Version, "Coordination Models Based on a Formal Model of Distributed Objected Reflection", 13 pages.
Leymann, F., et al., "Web Services and Business Process Management", IBM Systems Journal, vol. 41, No. 2, 2002, New Developments in Web Services and E-commerce, 11 pages.
Ivan, A.-A, et al., "Partionable services: A framework for seamlessly adapting distributed applications to heterogeneous environments", High Performance Distributed Computing, 2002. HPDC-11 2002. Proceedings. 11th IEEE International Symposium, 1 page.
Urban, Susan D., et al., "Active Declarative Integration Rules for Developing Distributed Multi-Tiered Applications", 3 pages.
Bischoff, Urs, et al., "Programming the Ubiquitous Network: A Top-Down Approach" System Support for Ubiquitous Computing Workshop (UbiSys'06), Orange County, USA, Sep. 2006, 8 pages.
Korb, John T., et al., "Command Execution in a Heterogeneous Environment", 1986 ACM, pp. 68-74.
Von, Vorgelet, et al., "Dynamic Upgrade of Distributed Software Components", 2004, 191 pages.

Poslad, Stefan, et al., "The FIPA-OS agent platform: Open Source for Open Standards", Apr. 2000, 17 pages.
Software News, "Progress Software Extends Lead in Distributed SOA" 2007, 6 pages.
Office Action dated Sep. 14, 2009 cited in U.S. Appl. No. 11/740,737.
Office Action dated Oct. 14, 2009 cited in U.S. Appl. No. 11/771,827.
Office Action dated Oct. 1, 2009 cited in U.S. Appl. No. 11/771,816.
Nastel Technologies, Inc., "AutoPilot Business Dashboard Configuration and User's Guide Version 4.4", 2006, AP/DSB 440.001, 82 pages.
TIBCO the Power of Now, "TIBCO BusinessFactor", 2006, 2 pages.
TIBCO, http://www.tibco.com/software/business_activity_monitoring/businessfactor/default.jsp, Copyright 2000-2007, 2 pages.
"Factal:Edge Enlists CMLgroup to Bring Visualization to Business Performance Management Clients", http://extranet.fractaledge.com/News/PressReleases/2006/060829, 2006, 2 pages.
Shaojie Wang, Synthesizing Operating System Based Device Drivers in Embedded Systems, 2003.
U.S. Appl. No. 11/771,827, Nov. 29, 2010, Notice of Allowance.
U.S. Appl. No. 11/925,067, Dec. 6, 2010, Notice of Allowance.
Rosenblum, D., and Wolf, A. "A Design Framework for Internet-Scale Event Observation and Notification," ACM SIGSOFT Software Engineering Notes. vol. 22, Issue 6, Nov. 1997. [retrieved on Jun. 12, 2011]. Retrieved from the Internet: <URL:www.acm.org>.
D. Raymar et al.; End-to-End Model Driven Policy Based Network Management; 2006—computer.org; pp. 1-4.
R.M. Argent et al.; Development of Multi-Framework Model Components; 2004; Citeseer; pp. 1-6.
U.S. Appl. No. 13/077,730, Jul. 14, 2011, Office Action.
U.S. Appl. No. 11/925,680, Jul. 18, 2011, Office Action.
U.S. Appl. No. 11/925,201, Jul. 19, 2011, Notice of Allowance.
Quentin Limbourg et al: "USIXML: A Language Supporting Multi-path Development of User Interfaces", Engineering Human Computer Interaction and interactive Systems; [Lecture Notes in Computer Science;;LNCS], Springer-Verlag, Berlin/Heidelberg, vol. 3425, Jun. 30, 2005 pp. 200-220, CP019009959 ISBN: 978-3-540-26097-4.
Pierre-Alain Muller et al., "Platform Independent Web Application Modeling and Development with Netsilon", Software & Systems Modeling, Springer, Berlin, DE, vol. 4, No. 4, Nov. 1, 2005, pp. 424-442, XP019357229, ISSN: 1619-1374.
Wang L J et al: "Abstract Interface Specification Languages for device-independent Interface Design: Classification, Analysis and Challenges", Pervasive Computing and Applications, 2006 1st International Symposium on, IEEE, PI, Aug. 1, 2006, pp. 241-246.
Jean Vanderdonckt ed—Oscar Pastor et al, "A MDA-Compliant Environment for Developing User Interfaces of information Systems", Advanced Information Systems Engineering; [Lecture Notes in Computer Science;;LNCS], Springer-Verlag, Berling, Berlin/Heidelberg, vol. 3520, May 17, 2005, pp. 16-31.
Xiaofeng Yu et al., "Towards a Model Driven Approach to Automatic BPEL Generation", Model Driven Architecture Foundations and Applications; [Lecture Notes in Computer Science;;LNCS], Springer Berlin Heidelberg, vol. 4530, Jun. 11, 2007 pp. 204-218.
Wikipedia, "Declarative Programming", available at wikipedia.org/w/index.php?title=Declarative_Programming&oldid=1645216, Last accessed Jul. 28, 2011, (3 pages).
Notice of Allowance dated Sep. 30, 2011 cited in U.S. Appl. No. 11/925,201.
Notice of Allowance dated Sep. 29, 2011 cited in U.S. Appl. No. 13/077,730.
Office Action dated Oct. 19, 2011 cited in U.S. Appl. No. 11/925,680.

\* cited by examiner

MODELING AND MANAGING HETEROGENEOUS APPLICATIONS

CROSS-REFERENCE TO RELATED APPLICATIONS

N/A.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

As computerized systems have increased in popularity, so have the complexity of the software and hardware employed within such systems. In general, the need for seemingly more complex software continues to grow, which further tends to be one of the forces that push greater development of hardware. For example, if application programs require too much of a given hardware system, the hardware system can operate inefficiently, or otherwise be unable to process the application program at all. Recent trends in application program development, however, have removed many of these types of hardware constraints at least in part using distributed application programs. In general, distributed application programs comprise components that are executed over several different hardware components, often on different computer systems in a tiered environment.

With distributed application programs, the different computer systems may communicate various processing results to each other over a network. Along these lines, an organization will employ a distributed application server to manage several different distributed application programs over many different computer systems. For example, a user might employ one distributed application server to manage the operations of an ecommerce application program that is executed on one set of different computer systems. The user might also use the distributed application server to manage execution of customer management application programs on the same or even a different set of computer systems.

Of course, each corresponding distributed application managed through the distributed application server can, in turn, have several different modules and components that are executed on still other different (and potentially differently configured) computer systems over different (and potentially differently configured) network connections. Thus, while this ability to combine processing power through several different computer systems can be an advantage, there are various complexities associated with distributing application program modules.

In many environments, there is multiple diverse implementation technologies composed into a distributed application. Nonetheless, the components of a distributed application operating in such an environment must behave coherently and reliably. Thus, an administrator or other user typically deals with each part of a distributed application individually and manually to make then work together. For example, to implement a distributed application an administrator or other user can be required to program individual parts of the distributed applications (e.g., Web sites, Web services, Workflows, Databases, etc.) using multiple different frameworks and hosting technologies (e.g., Web services, App servers, Database servers, etc.). The implementation-specific parts of the distributed application are then manually configured to connect and exchange data.

Subsequently, the administrator or other user can create text documents that describe how and when to deploy and activate parts of an application and what to do when failures occur. It is generally a manual task to act on what is described in these text documents. Accordingly the process of creating and executing a distributed application is typically expensive, error prone and not change-friendly.

BRIEF SUMMARY

The present invention extends to methods, systems, and computer program products for modeling and managing heterogeneous applications. The components of a composite distributed application are described in a declarative model. The declarative model includes a description of a plurality of different application parts of the composite distributed application. One or more abstractions are inserted into the declarative model. Each abstraction describes the intended behavior of a corresponding application part in an implementation independent manner. Thus, the abstractions extend the declarative model to make the declarative model executable.

In some embodiments, an implementation attribute is set on at least one abstraction. The implementation attribute expressly indicates how the abstraction is to be tagged. In other embodiments, no implementation attributes are set. However, in either of the embodiments, each of the one or more abstractions is tagged with a label. Each label includes implementation specific details that indicate how a plurality of different technologies are to be used to implement the corresponding application part.

When an abstraction includes an implementation attribute, the abstraction can be tagged with a label in accordance with the express indication in the implementation attribute. On the other hand, when an abstraction does not include an implementation attribute, a label can be inferred (e.g., based on available resources of different technologies, from prior system settings, from default values, etc.) and then tagged to the abstraction.

The declarative model is interpreted to implement an executable instance of the composite distributed application. The executable instance of the composite distributed application is implemented using the plurality of technologies in accordance with the implementation specific details included in the labels.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
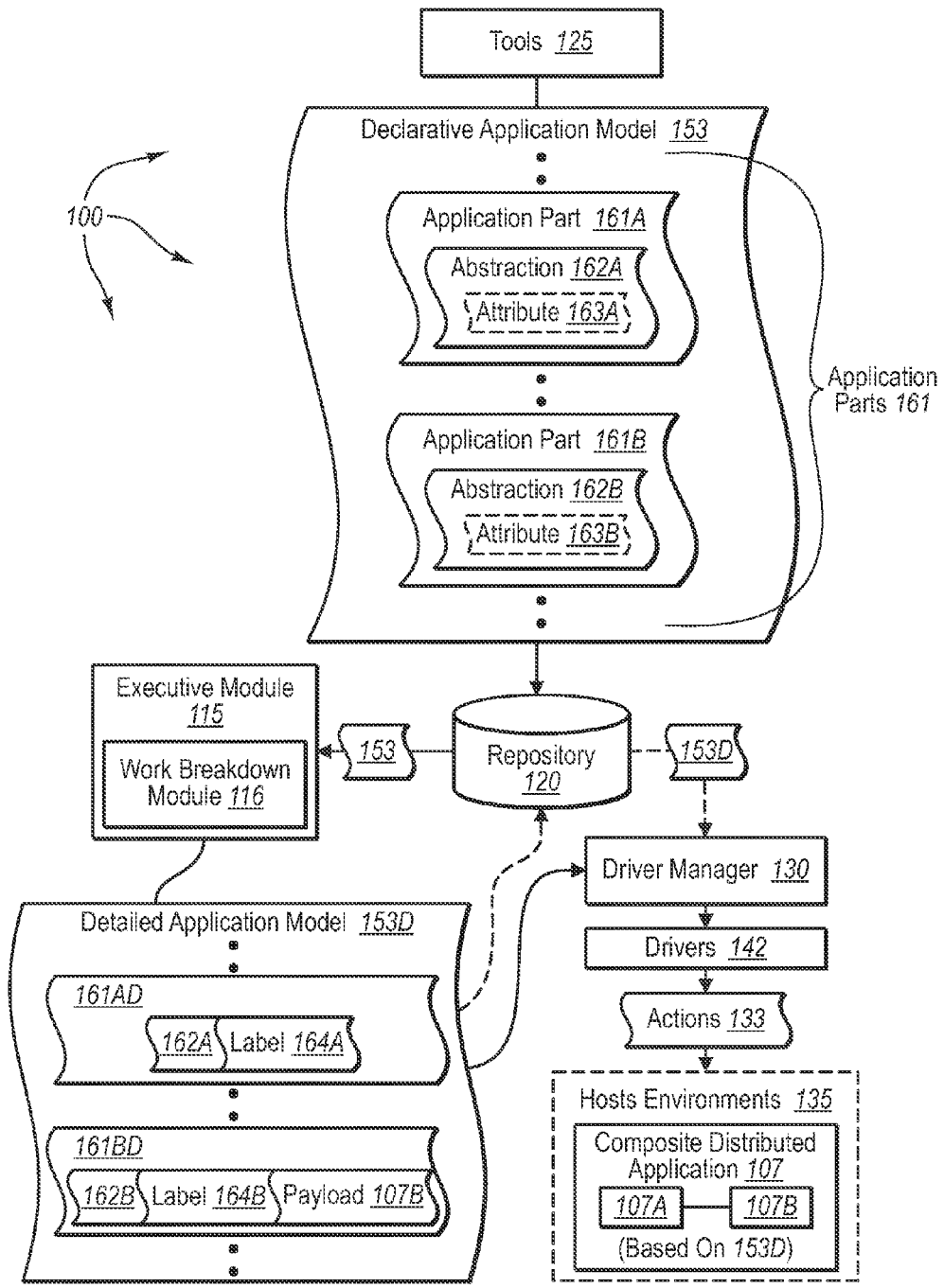
FIG. 1A illustrates an example computer architecture that facilitates modeling and managing heterogeneous applications.

The present invention extends to methods, systems, and computer program products for modeling and managing heterogeneous applications. The components of a composite distributed application are described in a declarative model. The declarative model includes a description of a plurality of different application parts of the composite distributed application. One or more abstractions are inserted into the declarative model. Each abstraction describes the intended behavior of a corresponding application part in an implementation independent manner. Thus, the abstractions extend the declarative model to make the declarative model executable.

In some embodiments, an implementation attribute is set on at least one abstraction. The implementation attribute expressly indicates how the abstraction is to be tagged. In other embodiments, no implementation attributes are set. However, in either of the embodiments, each of the one or more abstractions is tagged with a label. Each label includes implementation specific details that indicate how a plurality of different technologies are to be used to implement the corresponding application part.

When an abstraction includes an implementation attribute, the abstraction can be tagged with a label in accordance with the express indication in the implementation attribute. On the other hand, when an abstraction does not include an implementation attribute, a label can be inferred (e.g., based on available resources of different technologies, from prior system settings, from default values, etc.) and then tagged to the abstraction.

The declarative model is interpreted to implement an executable instance of the composite distributed application. The executable instance of the composite distributed application is implemented using the plurality of technologies in accordance with the implementation specific details included in the labels.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1A illustrates an example computer architecture 100 that facilitates modeling and managing heterogeneous applications. Depicted in computer architecture 100 are tools 125, repository 120, executive module 115, driver manager 130, drivers 142, and host environments 135. Each of the depicted components can be connected to one another over a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, tools 125 can be used to write declarative models for applications and store declarative models, such as, for example, declarative application model 153, in repository 120. Declarative models are used to describe the structure and behavior of real-world running (deployed) applications. Thus, a user (e.g., distributed application program developer) can use one or more of tools 125 to create declarative application model 153.

Generally, declarative models include one or more sets of high-level declarations expressing application intent for a distributed application. Thus, the high-level declarations generally describe operations and/or behaviors of one or more modules in the distributed application program. However, the high-level declarations do not necessarily describe implementation steps required to deploy a distributed application having the particular operations/behaviors (although they can if appropriate). For example, declarative application model 153 can express the generalized intent of a workflow, including, for example, that a first Web service be connected to a database. However, declarative application model 153 does not necessarily describe how (e.g., protocol), nor where (e.g., address) the Web service and database are to be connected to one another. In fact, how and where is determined based on which computer systems the database and the Web service are deployed.

In some embodiments, a composite distributed application is described using different application parts within a declarative application model. Each application part describes a portion of a distributed application, which can be composited together to provide desired functionality. For example, declarative application model 153 includes application part 161A and application part 161B. Application part 161A and application part 161B each describe a different portion of a composite distributed application modeled by declarative application model 153. For example, application part 161A can describe a Web service and application part 161B can describe a database.

Each application part can also include an abstraction that indicates the intended behavior of the described application part. For example, abstraction 162A and abstraction 162B can indicate the intended behavior of application part 161A and application part 161B respectively. However, abstractions do not necessarily indicate how intended behavior is to be implemented. For example, abstraction 162A can indicate a Web service internal behavior as a workflow, but not the environment where nor the technology with which the workflow is to be implemented.

Although in some embodiments, an abstraction also includes an attribute that expressly indicates implementation details for implementing intended behavior. For example, abstraction 162A can optionally include attribute 163A indicating implementation details for the intended behavior of application part 161A. Likewise, abstraction 162B can optionally include attribute 163B indicating implementation details for the intended behavior of application part 161B.

To deploy an application based on a declarative model, the declarative model can be sent to executive module 115. Executive module 115 can refine the declarative model until there are no ambiguities and the details are sufficient for drivers to consume. Thus, executive module 115 can receive and refine declarative model 153 so that declarative model 153 can be translated by drivers 142 (e.g., one or more technology-specific drivers) into a deployed application.

In general, "refining" a declarative model can include some type of work breakdown structure, such as, for example, progressive elaboration, so that the model declarations are sufficiently complete for translation by drivers 142. Since declarative models can be written relatively loosely by a human user (i.e., containing generalized intent instructions or requests), there may be different degrees or extents to which executive module 115 modifies or supplements a declarative model for deploying an application. Work breakdown module 116 can implement a work breakdown structure algorithm, such as, for example, a progressive elaboration algorithm, to determine when an appropriate granularity has been reached and instructions are sufficient for drivers.

Executive module 115 can also account for dependencies and constraints included in a declarative model. For example, executive module 115 can be configured to refine declarative model 153 based on semantics of dependencies between elements in the declarative model 153 (e.g., one web service connected to another). Thus, executive module 115 and work breakdown module 116 can interoperate to output detailed application model 153D that provides driver 130 with sufficient information to deploy distributed application 107.

In additional or alternative implementations, executive module 115 can also be configured to refine the declarative model 153 based on some other contextual awareness. For example, executive module 115 can refine the declarative model based on the inventory of host environments 135 that may be available in the datacenter where a distributed application program will be deployed. Executive module 115 can reflect contextual awareness information in detailed application model 153D.

In addition, executive module 115 can be configured to fill in missing data regarding computer system assignments. For example, executive module 115 might identify a number of different distributed application program modules in declarative model 153 that have no requirement for specific computer system addresses or operating requirements. Thus, executive module 115 can assign distributed application program modules to an available host environment on a computer system. Executive module 115 can reason about the best way to fill in data in a refined declarative model 153. For example, as previously described, executive component 115 may determine and decide which transport to use for an endpoint based on proximity of connection, or determine and decide how to allocate distributed application program modules based on factors appropriate for handling expected spikes in demand. Executive module 115 can then record missing data in detailed declarative model 153D (or segment thereof).

In addition or alternative implementations, executive module 115 can be configured to compute dependent data in the declarative model 153. For example, executive module 115 can compute dependent data based on an assignment of distributed application program modules to host environments on computer systems. Thus, executive module 115 can calculate URI addresses on the endpoints, and propagate the corresponding URI addresses from provider endpoints to consumer endpoints. In addition, executive module 115 may evaluate constraints in the declarative model 153. For example, the executive component 115 can be configured to check to see if two distributed application program modules can actually be assigned to the same machine, and if not, executive module 115 can refine detailed declarative model 153D to accommodate this requirement.

Accordingly, after adding appropriate data (or otherwise modifying/refining) to declarative model 153 (to create detailed application model 153D), executive component 115 can finalize the refined detailed application model 153D so that it can be translated by platform-specific drivers 130. To finalize or complete the detailed application model 153D, executive module 115 can, for example, partition a declarative application model into segments that can be targeted by any one or more platform-specific drivers 142. Thus, executive module 115 can tag each declarative application model (or segment thereof) with its target driver (e.g., the unique ID or an address of a platform-specific driver). Furthermore, executive module 115 can verify that a detailed application model (e.g., 153D) can actually be translated by one or more platform-specific drivers, and, if so, pass the detailed application model (or segment thereof) to a particular platform-specific driver for translation.

For example, executive module 115 can be configured to tag application parts with labels indicating an intended implementation for an application part. As depicted, detailed application model 153D includes application parts 161AD and 161BD that have been refined to remove ambiguities. Corresponding abstractions 162A and 162B have been associated with labels 164A and 164B respectively. Label 164A indicates an intended implementation for the intended behavior indicated in abstraction 162A. Likewise, label 164B indicates an intended implementation for the intended behavior indicated in abstraction 162B.

When appropriate, implementation specific payloads can also be added to compliment the description of the intended behavior after an abstraction has been labeled with an intended implementation. For example, payload 107B can be added to application part 161BD. Implementation specific payloads can be used to leverage implementation specific features not represented in abstractions. For example, payload 107B can be used to leverage an intended implementation indicated by label 164B.

After refining a model, executive module 115 can forward the model to driver manger 130 or store the refined model back in repository 120 for later use. Thus, executive module 115 can forward detailed application model 153D to driver manager 130 or store detailed application model 153D in repository 120. When detailed application model 153D is stored in repository 120, it can be subsequently provided to driver manger 130 without further refinements.

Driver manager 130 can then take actions (e.g., actions 133) to implement a composite distributed application (e.g., composite distributed application 107, including executable application parts 107A and 107B) based on detailed application model 153D. Driver manager 130 interoperates with one or more drivers and translators to translate detailed application module 153D (or declarative application model 153) into one or more (e.g., platform-specific) actions 133. Actions 133 can be used to realize the intended behavior indicated in abstractions within corresponding implementation host environments indicated in associated labels.

Accordingly, composite distributed application 107 can be implemented in host environments 153. Each application part can be implemented in a separate host environment (indicated in an associated label) and connected to other application parts via corresponding consumer and provider endpoints. Interconnected consumer and provider endpoints can also be modeled.

Figure 1B:
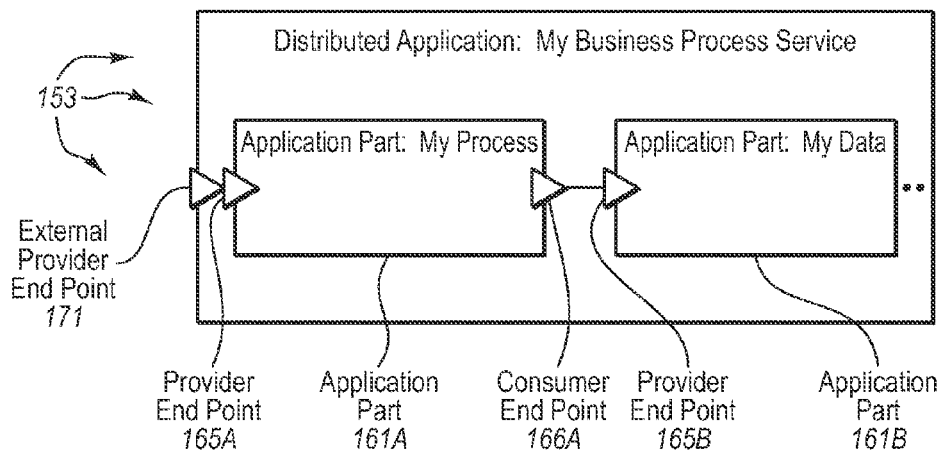
FIG. 1B illustrates an example declarative model for a composite distributed application.

For example, FIG. 1B illustrates a first alternate view of declarative application model 153. In FIG. 1B, declarative application model 153 models a Distributed Application named "MyBusinessProcessService". The distributed application model 153 models application part 161A and 161B. External provider endpoint 171 is configured to receive requests and delegate requests to provider endpoint 165A (a provider endpoint for application part 161A). Consumer endpoint 166A (a consumer endpoint for application part 161A) is connected to provider endpoint 165B (the provider endpoint for application part 161B). Accordingly, the first alternate view of declarative application model 153 in FIG. 1B indicates an intent to have a composite distributed application that receives requests and is composed of two application parts: process and data.

Figure 1C:
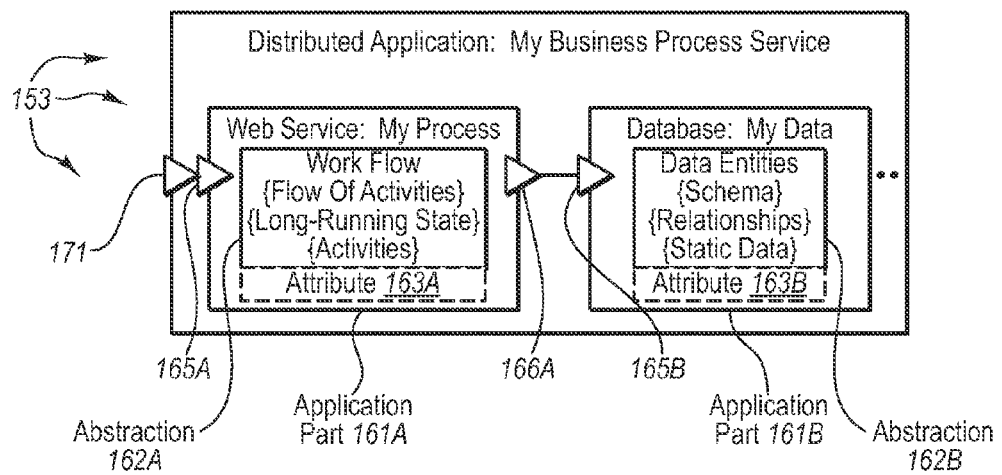
FIG. 1C illustrates an example declarative model for a composite distributed application including intended behaviors.

FIG. 1C illustrates a second alternate view of declarative model 153 including intended behaviors. In FIG. 1C, application part 161A indicates that "MyProcess" is a Web service. Abstraction 162A indicates that the intended behavior of the Web service is a Work Flow including a flow (e.g., trivially, a sequence) of activities, long-running state, and activities themselves. Optionally, abstraction 162A can include attribute 163A expressly indicating an implementation environment for implementing Work Flow behavior.

Likewise, application part 162A indicates that "MyData" is a Database. Abstraction 162B indicates that the intended behavior of "MyData" is Data Entities including schema, relationships, and a static data. Optionally, abstraction 162B can include attribute 163B expressly indicating an implementation environment for implementing Data Entities behavior.

Figure 1D:
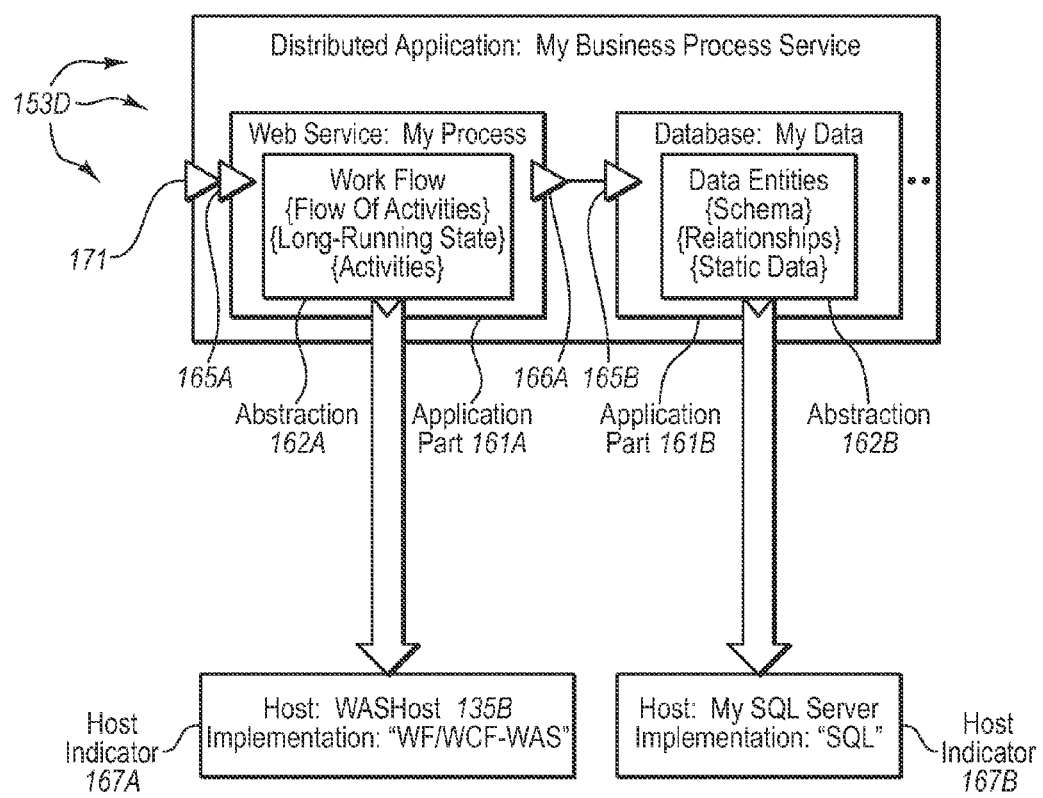
FIG. 1D illustrates an example declarative model for a composite distributed application including intended behaviors with labels indicating implementation details.

FIG. 1D illustrates an alternate view of detailed application model 153D including intended behaviors with labels indicating implementation details. The alternate view of detailed application model 153D can result from executive module 115 refining the second alternate view of descriptive application model 153. In FIG. 1D, label 166A indicates that the Work Flow behavior indicated in abstraction 162A is to be implemented in a "WCF/WF-WAS" (Windows® Workflow Foundation/Windows® Communication Foundation environment in a Windows® Activation Service host) environment. Likewise, label 166B indicates that the Data Entities behavior indicated in abstraction 162B is to be implemented in a "SQL" environment in a Microsoft SQL Server host.

An application part is further associated with a host indicator which can indicate a host (e.g., a specified computer system) that is to provide required implementation environment for the application part. For example, host indicator 167A indicates that WASHost 135B" is to provide a "WF/WCF-WAS" environment for implementing the intended Work Flow behaviors of abstraction 162A. Likewise, host indicator 167B indicates that "MySQLServer" is to provide an "SQL" environment for the intended Data Entities behaviors of abstraction 162B. The corresponding drivers can then process corresponding abstractions to implement the intended behavior in the indicated implementation environment in the indicated host. For example, WASHost 135B can be configured by the corresponding driver to provide a "WF/WCF-WAS" environment for implementing the intended Work Flow behaviors of abstraction 162A.

Figure 1E:
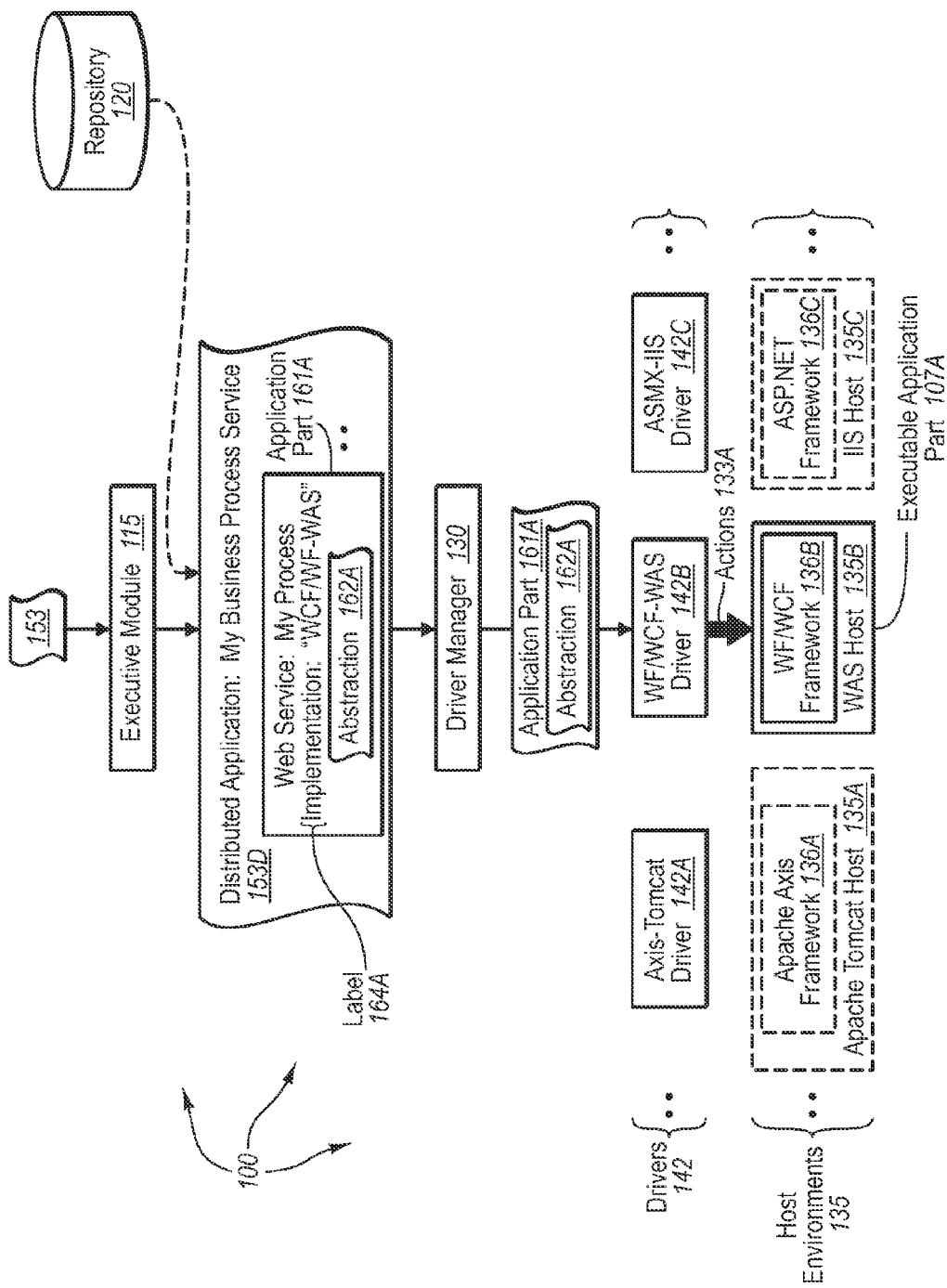
FIG. 1E illustrates another view of some of the components from the computer architecture of FIG. 1A interpreting a declarative application model.

For example, FIG. 1E illustrates another view of some of the components from computer architecture 100 interpreting declarative application model 153. As depicted, drivers 142 include a plurality of drivers including Axis-Tomcat driver 142A (for implementing intended behavior based on Apache Axis framework hosted in Apache Tomcat), WF/WCF-WAS driver 142B (for implementing intended behavior based on WF/WCF frameworks hosted in WAS), and ASMX-IIS Driver 142C (for implementing intended behavior based on Microsoft ASP.NET framework hosted in Microsoft Internet Information Server).

Host environments 135 depict resulting host environments that can be utilized by corresponding drives. For example, Axis-Tomcat driver 142A can translate intended behavior (e.g., from an abstraction) into actions for execution based on Apache Axis Framework 136A within Apache Tomcat Host 135A. Similarly, WF/WCF-WAS driver 142B can translate intended behavior into actions for execution based on WF/WCF Framework 136B within WASHost 135B. Likewise, ASMX-IIS Driver 142C can translate intended behavior into actions for execution based on ASP.Net framework 136C within IIS Host 135C.

Figure 2:
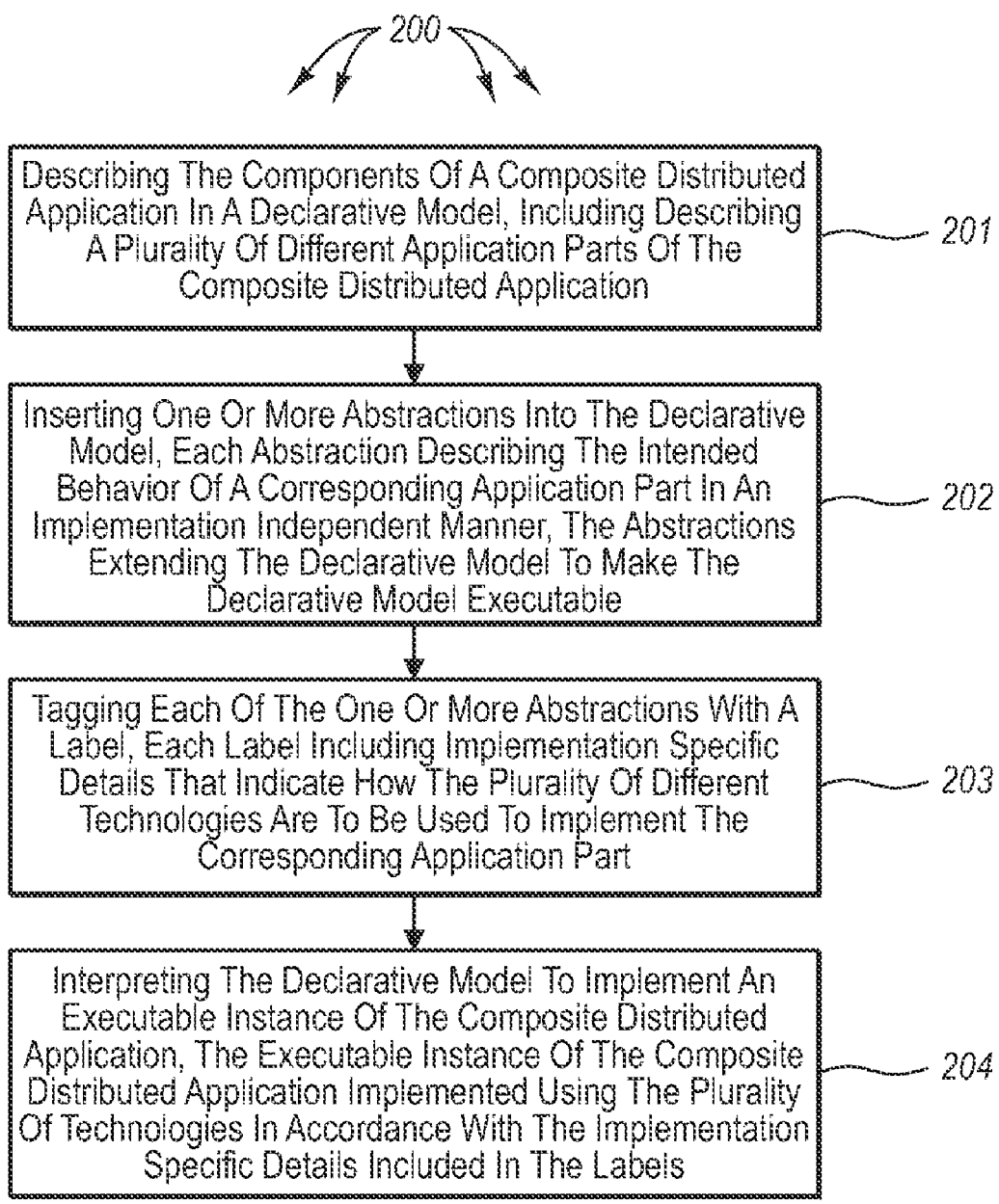
FIG. 2 illustrates a flow chart of an example method for implementing a composite distributed application.

FIG. 2 illustrates a flow chart of an example method 200 for implementing a composite distributed application. Method 200 will be described with respect to the components and data of computer architecture 100.

Method 200 includes an act of describing the components of a composite distributed application in a declarative model, including describing a plurality of different application parts of the composite distributed application (act 201). For example, referring to FIG. 1A, tools 125 can be used to describe components of composite distributed application 107 in declarative application model 153. As depicted, declarative application model 153 describes a plurality of application parts 161, including application parts 161A (a first application part) and 161B (a second application part). As previously described, application parts 161A and 161B can be different types of application parts, such as, for example, process and data.

Describing a composite distributed application can also include describing corresponding provider and consumer endpoints for the composite distributed application and provider endpoints as well as connections there between. For example, in the alternate view of declarative application model in FIGS. 1B and/or 1C, tools 125 can be used to describe external provider endpoint 171, provider endpoint 165A, consumer endpoint 165B, and provider endpoint 166A as well as the connection between consumer endpoint 165B and provider endpoint 166A.

Describing a composite application can also include setting implementation attributes on abstractions to expressly indicate the technologies that are to be used to implement application parts. For example, tools 125 can be used to set attributes 163A and/or 163B on application parts 161A and 161B respectively. As previously described, attribute 163A can expressly indicate an implementation environment for application part 161A and attribute 163B can expressly indicate an implementation environment for application part 161B.

Method 200 includes an act of inserting one or more abstractions into the declarative model, each abstraction describing the intended behavior of a corresponding application part in an implementation independent manner, the abstractions extending the declarative model to make the declarative model executable (act 202). For example, tools 125 can be used to insert abstractions 162A and 162B into declarative application model 153. Abstractions 162A and 162B described the intended behavior of application parts 161A and 161B respectively in an implementation independent manner. Accordingly, abstractions 162A and 162B extend declarative application model 153 to make declarative application model 153 executable.

Method 200 includes an act of tagging each of the one or more abstractions with a label, each label including implementation specific details that indicate how the plurality of different technologies are to be used to implement the corresponding application part (act 203). For example, executive module 115 can tag application part 161AD (a refined application part 161A) and application part 161BD (a refined application part 161B) with labels 164A and 164B respectively. Labels 164A and 164B include implementation specific details that indicate how technologies, such as, for example, Axis-Tomcat, WF/WCF-WAS, ASMX-IIS, SQL, etc., are to be used to implement corresponding application parts 161A and 161B respectively.

Executive module 115 can determine how to tag an application part in a variety of different ways. When an abstraction includes an implementation attribute, executive module 115 can tag the abstraction in accordance with the express indication in the implementation attribute. For example, when abstraction 162A includes attribute 163A (e.g., expressly indicating WF/WCF-WAS implementation), executive module 155 can configure label 164A in accordance with implementation details of attribute 163A (e.g., indicating that abstraction 162A is to be implemented using WF/WCF-WAS in WASHost). On the other hand, when an abstraction does not include an implementation attribute, a label can be inferred (e.g., based on available resources of different technologies, from prior system settings, from default values, etc.) and then tagged to the abstraction. For example, based on the level of available SQL resources compared to other types of database resources, executive module 115 can configure label 164B to indicate that abstraction 162B is to be implemented using SQL in MySQLServer host.

Method 200 includes an act of interpreting the declarative model to implement an executable instance of the composite distributed application, the executable instance of the composite distributed application implemented using the plurality of technologies in accordance with the implementation specific details included in the labels (act 204). For example, driver manager 130 can transfer the various application parts of detailed application model 153D to appropriate drivers in accordance with corresponding labels. Referring again to FIG. 1E, driver manager can transfer application part 161A to WF/WCF-WAS driver 142B based on label 164A indicating WF/WCF-WAS as the host environment for abstraction 162A. WF/WCF-WAS driver 142B can translate intended behavior represented in abstraction 162A into actions 133A (a subset of actions 133). Performance of actions 113A result in executable application part 107A being configured and later executed in WF/WCF framework environment 136B within WAS Host 135B.

Driver manager 130 can similarly transfer application part 161B to an SQL driver based on label 164B indicating SQL as the host environment for abstraction 162B. The SQL driver can translate intended behavior represented in abstraction 162B into another subset of actions 133. Performance of the other subset of actions results in application part 107B (see FIG. 1A) being configured and later executed in SQL environment within an SQL host. If appropriate, payload 107B can also be delivered to the SQL environment (e.g. static data).

Driver manager 130 can also interoperate with any utilized drivers to maintain provider and consumer endpoints to and from a resulting composite distributed application and to, from, and between various executable application parts of a composite distribute application.

In some embodiments, a declarative application model includes a plurality of interrelated model elements (e.g., within an application part, abstraction, etc.) that declare how a composite distributed application is to be configured and executed. Tools 125 can be used to create and modify declarative application models including model elements in accordance with the principles of the present invention. When a declarative application model is received, a driver manager can map included model elements to corresponding drivers and translators that can interpret them. From resulting interpretations, the driver manager can formulate an execution plan for actions to be performed on the host environment to configure and activate a distributed application.

Thus, a model interpreter can be configured to parse a received model and generate a corresponding execution plan. To generate an execution plan from a received model, the model interpreter can identify a model's constituent model elements and their relationships to one another. The model interpreter 243 can then call correspond model element interpreters (translators) to retrieve a sequence of actions for each model element. The model interpreter then combines the sequence of actions for each model element into a single sequence of actions for inclusion in an execution plan.

An action can include a variety of different properties. For example, an item can be Idempotent. That is, the same action successfully executed again on the same model element will result in the same output. An action can have a unique identifier that identifies an operation. If two actions are to do the same thing, the two actions can have same identifiers. For example, two activities that install a file can have the same identifier when the file has the same absolute path.

An action can also be associated with a corresponding reverse action. The reverse action can reverses the effects of the action. For example, the reverse of a CopyFile would be a procedure that removes a file or restores an original file that was copied over. An action can be associated with a corresponding update action that applies a newer version of a resource over an existing resource.

Figure 3:
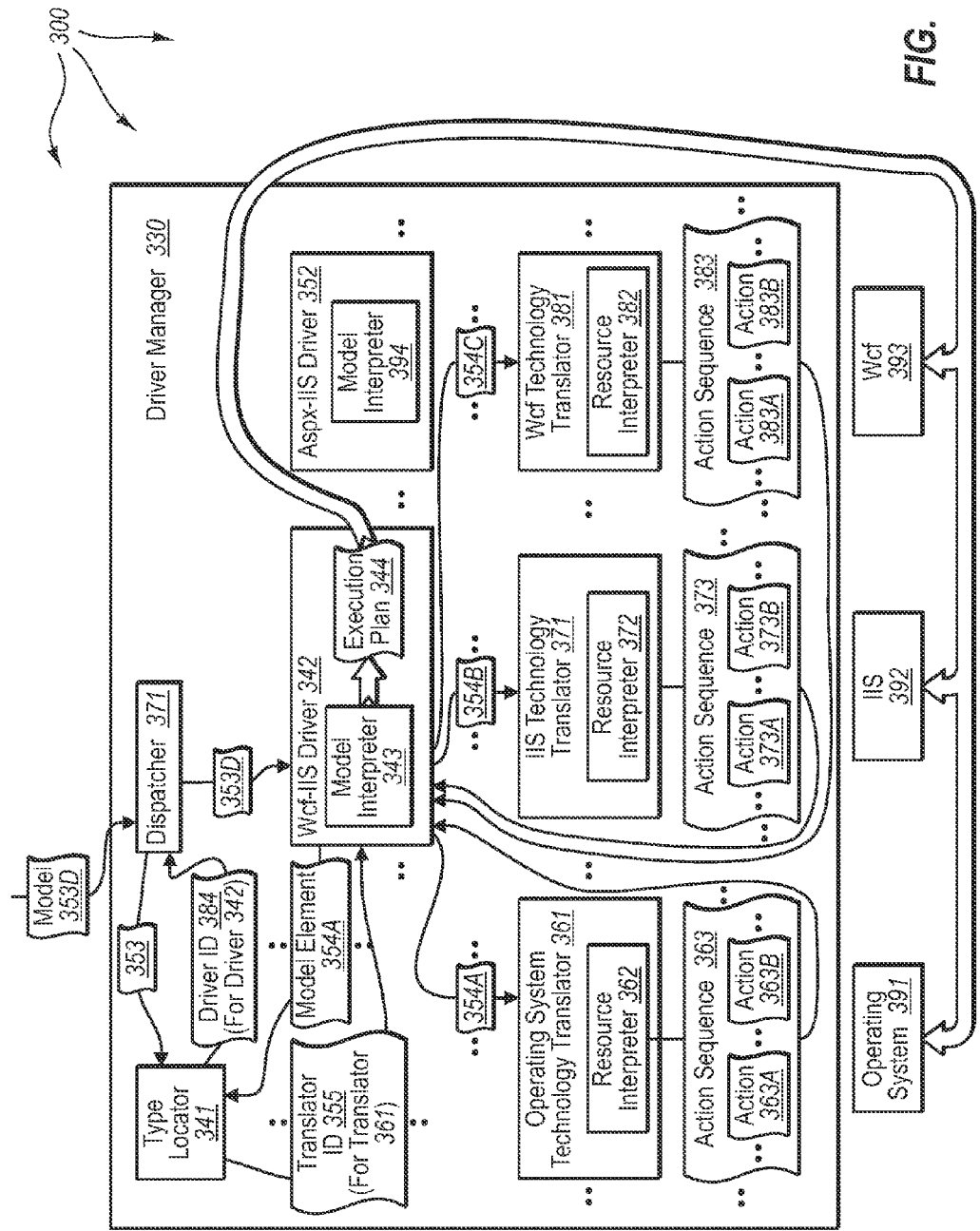
FIG. 3 illustrates an example computer architecture for translating declarative application models.

FIG. 3 illustrates an example computer architecture 300 for translating declarative application models. As depicted, computer architecture 300 includes driver manager 330. Driver manager 330 can be configured similarly to (or even the same as) driver manger 130 depicted in computer architecture 100. Driver manager 330 hosts drivers and translators and receives inputs. For example, driver manager 300 hosts a plurality of drivers, such as, for example, wcf-IIS driver 342 and Aspx-IIS driver 352.

Each driver can include a model interpreter (e.g., model interpreters 343 and 353 respectively) configured to parse a model and generate an execution plan. Thus, upon receiving a model, each driver can identify constituent resources and their relationships to one another, call appropriate resource interpreters to retrieve sequences of actions, and assemble sequences of actions into an execution plan.

Driver manager 300 also hosts a plurality of translators, such as, for example, operating system technology translator 361, IIS technology translator 371, and WCF technology translator 381. Each translator can include a resource interpreter (e.g., resource interpreters 362, 372, and 382 respectively) for parsing model elements describing a resource and assembling a sequence of actions that can be executed on what the resource represents. Each translator can correspond to a portion of the environment. For example, operating system technology translator 361 corresponds to operating system 391, IIS technology translator 371 corresponds to IIS 392, and WCF technology transfer 381 corresponds to WCF 393.

Accordingly, when a translator receives a model element describing a resource, the resource represents some object within the corresponding portion of the environment. For example, when operating system technology translator 361 receives a resource the resource corresponds to an object in operating system 391 (e.g., a service.svc file). Similarly, when IIS technology translator 371 receives a resource the resource corresponds to an object in IIS 392 (e.g., the location of a user's Web service—"/myservice"). Likewise, when WCF technology translator 381 the resource corresponds to an object in WCF 393 (e.g., a Web.config).

Generally, dispatcher 371 is configured to receive a model and dispatch the model to the appropriate driver. Thus, upon receiving a model, dispatcher 371 can forward the model to type locator 341. Type locator 341 can receive the model and based on the model locate the appropriate type of driver for processing the model (e.g., based on a corresponding label, such as, for example, label 164A or label 164B). Type locator 341 can return a driver ID identifying the appropriate type of drive back to dispatcher 371. Dispatcher 371 can then use the driver ID to dispatch the model to the identified appropriate driver.

Drivers can also utilize type locator 341 to locate appropriate translators for model element describing resources included in a model. For each resource in a model, a driver can submit the resource to type locator 341. Type locator 341 can receive the resource and based on the resource locate the appropriate type of translator for translating the resource. Type locator 341 can return a translator ID identifying the appropriate type of translator back to the driver. The driver can then use the translator ID to dispatch the resource to the identified appropriate translator The appropriate translator parses the received resource to assemble a sequence of actions for a received command and returns the sequence of actions back to the driver. The driver then assembles the different sequences of actions into a single execution plan. The driver then executes the execution plan. Actions in the execution plan are executed in sequence, operating directly on the environment (e.g., on one or more of operating system 391, IIS 391, and WCF 392), to realize the intent collectively represented in model 353 and command 329.

Thus, for example, dispatcher 371 can receive detailed application model 353D, including a plurality of interrelated model elements declaring how to configure and execute an application. Dispatcher 371 can send detailed application model 353D to type locator 341. Type locator 341 can detailed application model 353D. Type locator 341 can process detailed application model 353D to determine the type of driver appropriate for processing detailed application model 353D. In response to the determination, type locator 341 can send driver ID 384 (an identifier for driver 342) to dispatcher 371.

Dispatcher 371 can utilize driver ID 384 to forward detailed application model 353D to Wcf-IIS driver 342. Model interpreter 343 can parse detailed application model 353D to identify model elements within detailed application model 353D and the model elements' relationships to one another. For example, model interpreter 343 can identify model element 354A, 354B, 354C, etc. (e.g., within application parts, abstractions, etc). Wcf-IIS driver 342 can send identified model elements, such as, for example, model element 354A, to type locator 341. Type locator 341 can receive model element 354A. Type locator can process model element 354A to determine the type of translator appropriate for translating model element 354A.

Determining the type of translator can be based on a specified technology (e.g., one of an operating system, network protocol, data type, etc.) indicated in and/or related to model element 354A. For example, type locator 341 can determine that operating system technology translator 361 is the appropriate driver for translating model element 354A based on model element 354A indicating or being related to operating system 391. In response to the determination, type locator 341 can send translator ID 355 (an identifier for translator 361) to Wcf-IIS driver 342. Similar determinations can be made for model elements 354B, 354C, etc. included in model 353.

Wcf-IIS driver 342 can utilize translator ID 355 to forward model element 354A to operating system technology translator 361. Resource interpreter 362 can translate model element 354A into action sequence 363. Action sequence 363 includes a plurality of actions, such as, for example, actions 363A, 363B. etc, that are to be executed in operating system 391 to implement the intent of detailed application model 353D.

Similarly, Wcf-IIS driver 342 can utilize an appropriate translator ID to forward model element 354B to IIS technology translator 371. Resource interpreter 372 can translate model element 354B into action sequence 373. Action sequence 373 includes a plurality of actions, such as, for example, actions 373A, 373B. etc, that are to be executed in IIS 392 to implement another portion of the intent of detailed application model 353D.

Likewise, Wcf-IIS driver 342 can utilize an appropriate translator ID to forward model element 354C to WCF technology translator 381. Resource interpreter 382 can translate model element 354C into action sequence 383. Action sequence 383 includes a plurality of actions, such as, for example, actions 383A, 383B. etc, that are to be executed in WCF 393 to implement further portion of the intent of detailed application model 353D.

Further model elements can also be sent to any of operating system technology translator 361, IIS technology translator 371, WCF technology translator 381, as well as to other appropriate technology translators (not shown), based on a model element indicating and/or being related to a specified technology.

Model interpreter 343 can receive action sequence 363 from operating system technology translator 361, action sequence 373 IIS technology translator 371, action sequence 383 WCF technology translator 381, etc. Each action sequence is a subset of the total actions that are to be performed to fully implement the intent of detailed application model 353D. Model interpreter 343 can assemble action sequences 363, 373, 383, etc. into execution plan 344. Action sequences 363, 373, 383, etc., are assembled in a designated order based on the relationship between corresponding model elements in detailed application model 353D. Wcf-IIS driver 342 can execute execution plan 344 to implement a composite distributed application based on the intent for detailed application model 353D that is to use portions of operating system 391, IIS 392, and WCF 393, etc.

Accordingly, embodiments of the present invention facilitate modeling and managing heterogeneous applications. Application intent can be described in a relatively straight forward manner that abstracts underlying implementation details. Thus, application developers can develop applications without necessarily having to know extensive details of an underlying implementation environment. In any event, an application can be executed in different implementation environments without requiring changes to the corresponding model.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system within a computing environment, the computing environment including a plurality of different technologies for implementing distributed applications, a method for implementing a composite distributed application, the method comprising:

an act of describing the components of a composite distributed application in a declarative model in an implementation independent manner that describes operations and intended behaviors of the components without describing each implementation step for deploying the components within different technology and computing environment contexts, including describing a plurality of different application parts that each describes a portion of the composite distributed application;

an act of inserting a plurality of abstractions into the declarative model, each abstraction describing the operation and intended behavior of a corresponding application part in an implementation independent manner so that the corresponding application part is deployable using different computing technologies and in different computing environments, the plurality of abstractions extending the declarative model to make the declarative model executable;

an act of setting an implementation attribute on at least one inserted abstraction, the implementation attribute including implementation details expressly indicating how the at least one inserted abstraction is to be tagged to indicate an intended implementation of the operation and intended behavior of the at least one inserted abstraction;

in response to a request to deploy the composite distributed application in a particular computing environment, an act of refining the declarative model for deployment within the particular computing environment, including an act of tagging each of the plurality of abstractions with a label, each label including implementation specific details that indicate how one or more technologies that are specific to the particular computing environment are to be used to implement the corresponding application part when deployed within the particular computing environment, at least one label based on the implementation attribute set on the at least one inserted abstraction, and at least one label inferred from the particular computing environment; and an act of interpreting the refined declarative model to implement an executable instance of the composite distributed application within the particular computing environment, the executable instance of the composite distributed application implemented using the one or more technologies that are specific to the particular computing environment in accordance with the implementation specific details included in the labels.

2. The method as recited in claim 1, wherein the act of describing the components of a composite distributed application in a declarative model comprises an act of describing a process application part and a data application part of the composite distributed application.

3. The method as recited in claim 2, wherein the act of describing a process application part and a data application part of the composite distributed application comprises an act of describing Web Services and Databases.

4. The method as recited in claim 1, wherein the act of describing the components of a composite distributed application in a declarative model comprises:
an act of describing endpoints connecting the plurality of different application parts to one another; and
an act of describing an external provider endpoint for communicating with the composite distributed application.

5. The method as recited in claim 1, wherein the act of tagging each of the plurality of abstractions with a label comprises an act of inferring how an abstraction is to be tagged based on one or more of: available system resources of different technologies, prior system settings, and default system values.

6. The method as recited in claim 1, wherein the act of interpreting the refined declarative model to implement an executable instance of the composite distributed application within the particular computing environment comprises an act of implementing different application parts of the composite distributed application in different host environments.

7. The method as recited in claim 1, wherein the computer system further includes one or more drivers, each driver configured to process abstractions for a specified combination of different technologies, the computer system further including one or more translators, each translator configured to process model elements representing objects within a specified technology from among the plurality of different technologies, and wherein the act of interpreting the refined declarative model to implement an executable instance of the composite distributed application within the particular computing environment comprises:
for each abstraction:
an act of identifying a driver that is configured to process a described application part corresponding to the combination of technologies indicated for the abstraction;
an act of forwarding the application part to the identified driver; and
an act of the identified driver parsing the application part to identify model elements and their relationship to one another;
for each identified model element:
an act of identifying a translator configured to translate model elements for the specified technology corresponding to the identified model element;
an act of sending the model element to the translator;
an act of receiving a sequence of actions that are to be performed within the specified technology to partially implement the composite distributed application, the sequence of actions being a subset of the total actions that are to be performed to fully implement the composite distributed application; and
an act of assembling the received sequence of actions for the model element into an execution plan, the received sequence of actions assembled into the execution plan in a designated order with respect to sequences of actions received for other model elements based on the model element's relationship to other model elements in the received declarative model; and
an act of executing the execution plan to implement the composite distributed application, execution of the execution plan including executing the sequences of actions received for each model element in the designated order.

8. The method as recited in claim 1, wherein the act of interpreting the refined declarative model to implement an executable instance of the composite distributed application within the particular computing environment comprises processing each abstraction in the refined declarative model with a different driver.

9. The method as recited in claim 1, wherein the act of interpreting the refined declarative model to implement an executable instance of the composite distributed application within the particular computing environment comprises deploying each application part on a different computing system within the particular computing environment.

10. A computer program product for use at a computer system within a computing environment, the computing environment including a plurality of different technologies for implementing distributed applications, the computer program product for implementing a method for implementing a composite distributed application, the computer program product comprising one or more physical storage media having stored thereon computer-executable instructions that, when executed at a processor, cause the computer system to perform the method including the following:
describe the components of a composite distributed application in a declarative model, including describing a plurality of different application parts that each describes a portion of the composite distributed application in an implementation independent manner that describes operations and intended behaviors of the application parts without describing each implementation step for deploying the application parts within different technology and computing environment contexts;
insert a plurality of abstractions into the declarative model, each abstraction describing the operation and intended behavior of a corresponding application part in an implementation independent manner so that the corresponding application part is deployable using different computing technologies and in different computing contexts, the plurality of abstractions extending the declarative model to make the declarative model executable;
set an implementation attribute on at least one inserted abstraction, the implementation attribute including implementation details expressly indicating how the at least one inserted abstraction is to be tagged to indicate an intended implementation of the operation and intended behavior of the at least one inserted abstraction;
receive a request to deploy the composite distributed application in a particular computing environment, and in response:
refine the declarative model for deployment within the particular computing environment, including tagging each of the plurality of abstractions for implementation with a label, each label including implementation specific details that indicate how different technologies available within the particular computing environment are to be used to implement the corresponding application part, including:
   tagging the at least one inserted abstraction for implementation based on the implementation details in the implementation attribute; and
   tagging at least one other inserted abstraction for implementation based on information inferred from the particular computing environment; and
interpret the refined declarative model to implement an executable instance of the composite distributed application within the particular computing environment, the executable instance of the composite distributed application implemented using the technologies available within the particular computing environment in accordance with the implementation specific details included in the labels.

11. The computer program product as recited in claim 10, wherein computer-executable instructions that, when executed, cause the computer system to describe the components of a composite distributed application in a declarative model comprises computer-executable instructions that, when executed, cause the computer system to describe a process application part and a data application part of the composite distributed application.

12. The computer program product recited in claim 10, wherein computer-executable instructions that, when executed, cause the computer system to describe the components of a composite distributed application in a declarative model comprise computer-executable instructions that, when executed, cause the computer system to:
   describe endpoints connecting the plurality of different application parts to one another; and
   describe an external provider endpoint for communicating with the composite distributed application.

13. The computer program product as recited in claim 10, wherein computer-executable instructions that, when executed, cause the computer system to tag each of the plurality of abstractions with a label comprises computer-executable instructions that, when executed, cause the computer system to infer how an abstraction is to be tagged based on one or more of: available system resources of different technologies, prior system settings, and default system values.

14. The computer program product as recited in claim 10, wherein computer-executable instructions that, when executed, cause the computer system to interpret the refined declarative model to implement an executable instance of the composite distributed application within the particular computing environment comprises computer-executable instructions that, when executed, cause the computer system to implement different application parts of the composite distributed application in different host environments.

15. A computer system, comprising:
   one or more processors; and
   one or more physical computer storage media storing computer-executable instructions which, when executed, cause the one or more processors to implement a method for describing the intended executable behavior of a composite distributed application in an implementation-independent manner, and for refining the description for execution within particular computing environments, the method comprising:
      an act of describing a composite distributed application in a declarative model, the declarative model having a plurality of model elements, each model element representing a portion of the intended executable behavior of the composite distributed application in an implementation independent manner that describes operations and intended behaviors of the plurality of model elements without describing each implementation step for deploying the model elements within different technology and computing environment contexts, the description of the composite distributed application including at least:
         an act of describing a first application part of the composite distributed application, the first application part being a first specified type of application part, including:
            an act of declaring a first abstraction for the first application part, the first abstraction describing the intended execution behavior of the first application part in an implementation independent manner so that the first application part is deployable using different computing technologies and in different computing environments; and
         an act of describing a second part of the composite distributed application, the second part being a second different specified type of application part, including:
            an act of declaring a second abstraction for the second application part, the second abstraction describing the intended execution behavior of the second application part in an implementation independent manner so that the second application part is deployable using different computing technologies and in different computing environments; and
      in response to a request to deploy the composite distributed application in a particular computing environment, an act of refining the declarative model for deployment within the particular computing environment, including:
         an act of tagging each of the first and second abstraction with a corresponding first and second label, respectively, that includes implementation specific details that indicate how technologies specific to the particular computing environment are to be used to implement the corresponding application part, one of the first and second labels being based on an implementation attribute set on one of the abstractions, and an alternate one of the first and second labels being inferred from the particular computing environment.

16. The computer system as recited in claim 15, wherein the act of describing a composite distributed application in a declarative model comprises an act of describing a composite distributed application, wherein the first application part is a process and the second application part is data.

17. The computer system as recited in claim 15, wherein the act of describing a first application part of the composite distributed application comprises an act of setting a first implementation attribute on the first abstraction to expressly indicate the technologies that are to be used to implement the first application part.

18. The computer system as recited in claim 15, further comprising:
   an act of describing an external provider endpoint for the composite distributed application, the external provider endpoint configured to:

receive requests from components external to the composite distributed application; and delegate the requests to a first part provider endpoint for processing.

19. The computer system as recited in claim 15, wherein:

the act of describing a first application part of the composite distributed application further includes:

an act of declaring a first application part provider endpoint that provides information processed at the first application part to external components; and an act of declaring a first part consumer endpoint that consumes information from external components; and the act of describing a second part of the composite distributed application further includes:

an act of declaring a second application part provider endpoint that provides information to external components, the second application part provider endpoint connectable to consumer endpoints including the first application part consumer endpoint; and an act of declaring a second application part consumer endpoint that consumes information from external components, the second application part consumer endpoint connectable to other provider endpoints.

* * * * *